United States Patent [19]  
Takahashi

[11] Patent Number: 4,783,154  
[45] Date of Patent: Nov. 8, 1988

[54] IMAGE-TRANSMITTING OPTICAL SYSTEM
[75] Inventor: Susumu Takahashi, Tokyo, Japan
[73] Assignee: Olympus Optical Co., Ltd., Tokyo, Japan
[21] Appl. No.: 888,377
[22] Filed: Jul. 23, 1986
[30] Foreign Application Priority Data
  Jul. 25, 1985 [JP] Japan ................ 60-162865
[51] Int. Cl.⁴ .................. G02B 23/00; G02B 9/04
[52] U.S. Cl. .................................... 350/413
[58] Field of Search ............... 350/413, 480, 573
[56] References Cited
  FOREIGN PATENT DOCUMENTS
  49-5993 2/1974 Japan.
  52-4245 1/1977 Japan.
  58-1912 1/1983 Japan.

Primary Examiner—John K. Corbin
Assistant Examiner—Rebecca D. Gass
Attorney, Agent, or Firm—Cushman, Darby & Cushman

[57] ABSTRACT

The image-transmitting optical system comprising two rod-like lens components, at least one component having a concave air-contact surface, and at least one component including an inhomogeneous lens. In this optical system, curvature of field is eliminated, the loss of illumination intensity and the amount of flare are small, and the deterioration of the image by the decentering is also small.

25 Claims, 10 Drawing Sheets

SPHERICAL ABERRATION

ASTIGMATISM

COMA

SPHERICAL ABERRATION

ASTIGMATISM

COMA

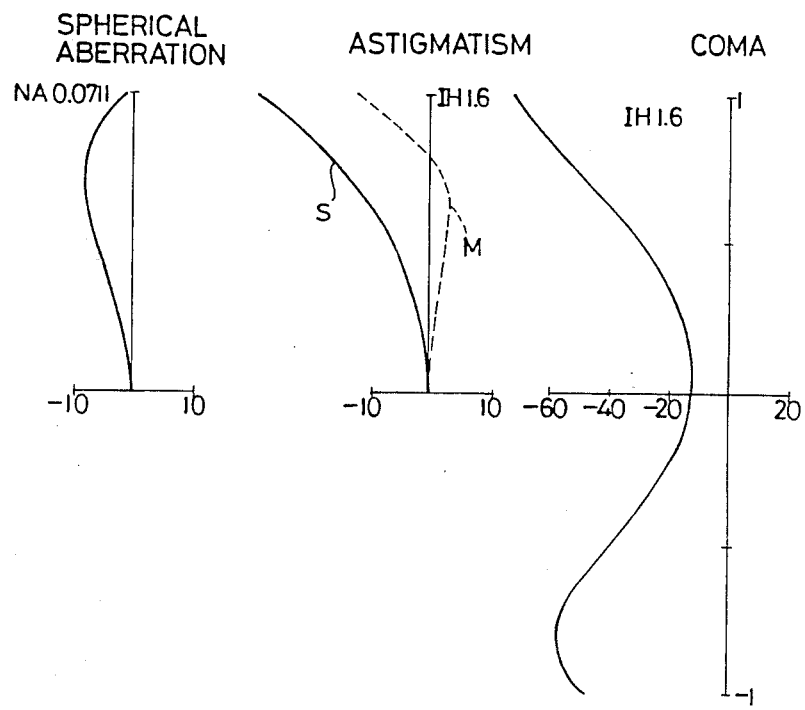

IMAGE-TRANSMITTING OPTICAL SYSTEM

BACKGROUND OF THE INVENTION (a) Field of the Invention

The present invention relates to an image-transmitting optical system used for a device such as an endoscope (which is not flexible), especially an image-transmitting optical system using inhomogeneous lenses.

(b) Description of the Prior Art

Conventional image-transmitting optical system used for endoscopes, etc., comprised only homogeneous lenses. That is, an optical system for an endoscope, as shown in FIG. 1, comprises an objective lens 1, an image-transmitting optical system 2 and an eyepiece 3. Among them, the image-transmitting optical system 2 may be, for example, of a lens as shown in FIG. 2 that is disclosed in Japanese Published Examined patent application No. 5993/74. In this optical system, curvature of field is not eliminated.

There exists prior art which has made an improvement and that is a lens system disclosed in Japanese Published Unexamined patent application No. 4245/77, as shown in FIG. 3. In this lens system, curvature of field is substantially eliminated. This lens system, however, has defects in that, for example, the lens construction is complex, the number of lenses is large, and there are many air-contact surfaces.

Recently, graded refractive index lenses (inhomogeneous lenses) have been developed.

An optical system for an endoscope using the inhomogeneous lens is shown in FIG. 4. In this optical system for an endoscope, there is one image-transmitting optical system 4 comprising an inhomogeneous lens both surfaces of which are plane. This inhomogeneous lens of the image-transmitting optical system has the refractive index whose distribution decreases substantially with the square of the distance from the center to a periphery of the lens so that light ray travels in a curve, as shown in FIG. 5, and an image is transmitted. In the image-transmitting optical system using this inhomogeneous lens, the construction is very simple but curvature of field is not eliminated.

SUMMARY OF THE INVENTION

It is a primary object of the present invention to provide an image-transmitting optical system in which curvature of field is corrected favorably, the loss of illumination intensity and the amount of flare are small and the decentering of the lenses in the lens frame is difficult to develop when they are assembled.

It is possible to achieve this object of the present invention by the image-transmitting optical system which comprises two rod-like lens components, at least one of which has a concave air-contact surface and at least one of which is a cemented lens including a graded refractive index lens (GRIN lens or inhomogeneous lens).

In an inhomogeneous lens, refractive index distribution thereof has a power so that this type of lens as a whole is rendered to have a power even if both surfaces thereof are plane. Making use of this characteristic, it is possible to make the lens to continue having a power even when this lens is cemented to another lens, which enables to decrease the air-contact surfaces. Moreover, when an air-contact surface is made concave, the negative field curvature coefficient is generated by the function of this concave surface, so it is possible to decrease the Petzval sum and to correct curvature of field (where field curvature coefficient means the third order aberration coefficient for curvature of field on a lens surface). Especially, it is desirable to use an inhomogeneous lens as an image-forming lens, to make one surface of an inhomogeneous lens an air-contact surface, and to make this surface concave.

An image-transmitting optical system according to the present invention has the lens construction, for example, as shown in FIG. 6, in which a homogeneous lens 11 is cemented to an inhomogeneous lens 12 having a positive power on the whole and a concave air-contact surface, and this cemented lens has a positive power on the whole. This optical system forms the image of an image I at I' successively, and the image is transmitted. Due to this construction, as is explained above, the negative field curvature coefficient generated by the concave surface decreases the Petzval sum and curvature of field is eliminated.

It is possible to make the effect of correcting curvature of field especially enhanced when both the ratio $R\phi$ of $\phi_g$ to $\phi_s$ and the ratio $R_p$ of $P_g$ to $P_s$ satisfy the following conditions (1) and (2), wherein $\phi_g$ representss the power of the inner portion of the inhomogeneous lens, $\phi_s$ represents the power of the concave surface thereof, $P_g$ represents the field curvature coefficient generated by the inner portion of the inhomogeneous lens and $P_s$ represents the field curvature coefficient generated by the concave surface thereof.

$$R_{100} = |\phi_s/\phi_g| > 0.2 \tag{1}$$

$$R_p = |P_s/P_g| > 0.2 \tag{2}$$

If the values become smaller than the lower limits of these conditions (1) and (2), the effect of eliminating curvature of field will not become so distinguished, which will not be desirable.

When the refractive index distribution of an inhomogeneous lens is axially symmetrical and varies as the radius increases from the center to a periphery, the ratio $R_p$ of the field curvature coefficient $P_g$ generated by the inner portion of the inhomogeneous lens to the field curvature coefficient $P_s$ generated by the air-contact surface thereof is given by the following formula:

$$R_p = \frac{N^2(0) \cdot c}{2N(1) \cdot t} \cdot \Delta\left(\frac{1}{N(0)}\right)$$

where c represents the curvature of the air-contact surface of the inhomogeneous lens, t represents the thickness thereof, and N(0) and N(1) represent respectively the refractive index at the center of the inhomogeneous lens and the coefficient of $r^2$ of the refractive index distribution, both of which are expressed by the following formula:

$$n(r) = N(0) + N(1) \cdot r^2 + N(2) \cdot r^4 + N(3) \cdot r^6 + \ldots$$

$$\Delta\left(\frac{1}{N(0)}\right) = \frac{1}{N(0)} - 1$$

On the other hand, a homogeneous lens in the image-transmitting optical system according to the present invention has the following roles.

One of the roles is to transmit the pupil as well as to transmit the image.

In order to continue to transmit the image plurality of times, the pupil must also be transmitted appropriately. Otherwise, the illumination of the edge of the image field would decrease, or as the case may be, the illumination would not be transmitted at all.

According to the present invention, the ray incident parallel with the optical axis to the homogeneous lens 11 from the off-axial object point is curved by the convex surface of the homogeneous lens 11, crosses the optical axis at the center of the inhomogeneous lens 12 facing to each other, and becomes parallel again with the optical axis by the convex surface of another homogeneous lens. In other words, the optical system according to the present invention has the construction where both the entrance pupil and the exit pupil are positioned at infinite.

Another role of the homogeneous material is that this homogeneous lens is of a rod-like leens in which the space between the inhomogeneous lens having the image-forming function and the convex surface of the homogeneous lens having the function as a field lens is filled with glass. Therefore, it is possible to transmit light approximately n times N.A. as compared with the case where the space between the lenses having these two functions, i.e., between the field lens and the image-forming lens, is of an air-space, wherein n represents the refractive index of the glass of the homogeneous lens. Illumination intensity of the optical system is proportional to the square of N.A. so that it is possible to obtain $n^2$ times illumination intensity as compared with the case in which the space is of an air-space.

Finally, according to the present invention, the homogeneous lens and the inhomogeneous lens are cemented to each other so that while the number of air-contact surfaces decrease, there is little deterioration of the image affected by the decentering which is caused by the play developed when the optical system is assembled into a pipe. This is because it is possible to make the tilt of the lens smaller than that in the homogeneous lens and the inhomogeneous lens which are not cemented but separated, even though the gap between the lens and the pipe is the same in both cases.

In the same way, when the peripheral portion of the concave surfaces of the inhomogeneous lenses 12 disposed face to face are cemented to each other thereby to form the convex-shape air lens therein, it will be possible to make the decentering of the lens small.

DETAILED DESCRIPTION OF THE PREFERRED EMBODIMENTS

Preferred Embodiments of the image-transmitting optical system according to the present invention are explained below.

Figure 6:
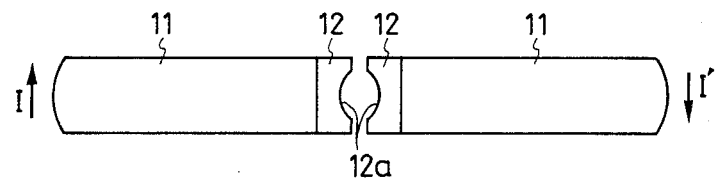
FIG. 6 shows a sectional view of Embodiment 1 of the image-transmitting optical system according to the present invention.

Embodiment 1 according to the present invention has the lens construction which is already shown in FIG. 6 as a basic construction according to the present invention, where two cemented lens components comprising a homogeneous lens 11 and an inhomogeneous lens 12 are arranged symmetrically so that the concave surfaces 12a of the inhomogeneous lens 12 are disposed face to face.

Figure 7:
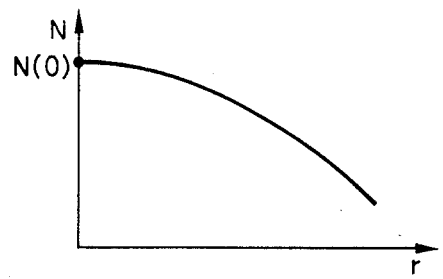
FIG. 7 shows a schematical view representing the refractive index distribution of an inhomogeneous lens.

The refractive index distribution is given by the aforementioned formula where the refractive index decreases with the square of the distance from the center to a periphery, as shown in FIG. 7. The refractive index at the center of the inhomogeneous lens is larger than that of the homogeneous lens.

The numerical data of this Embodiment 1 according to the present invention are as follows:

$r_1$ = 17.8274
$d_1$ = 36.8593     $n_1$ = 1.51633
$r_2$ = ∞
$d_2$ = 8.4407      $n_2$ = 1.6455      (inhomogeneous)
$r_3$ = 7.2122
$d_3$ = 3.4
$r_4$ = −7.2122
$d_4$ = 8.4407      $n_3$ = 1.6455      (inhomogeneous)
$r_5$ = ∞
$d_5$ = 36.8593     $n_4$ = 1.51633
$r_6$ = −17.8274
$N(0)$ = 1.6455                $N(1)$ = −0.6883 × $10^{-2}$
$N(2)$ = 0.34386 × $10^{-4}$   $N(3)$ = −0.19156 × $10^{-6}$
$R_\phi$ = 0.852 > 0.2         $R_p$ = 1.267 > 0.2

This Embodiment 1 according to the present invention has a simple construction in which, as is explained above, the plano-convex homogeneous lens and the plano-concave inhomogeneous lens are cemented together. There are only four air-contact surfaces for one time image transmission.

Figure 1:
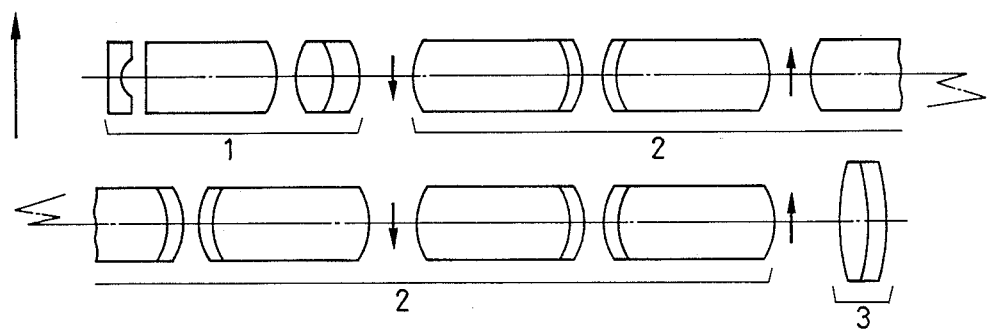
FIG. 1 shows a diagrammatical view of the configuration of a conventional optical system for an endoscope.
Figure 2:
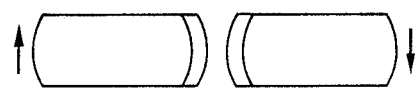
FIGS. 2 through 4 respectively show diagrammatical view of the configuration of conventional image-transmitting optical systems.
Figure 3:
Figure 4:
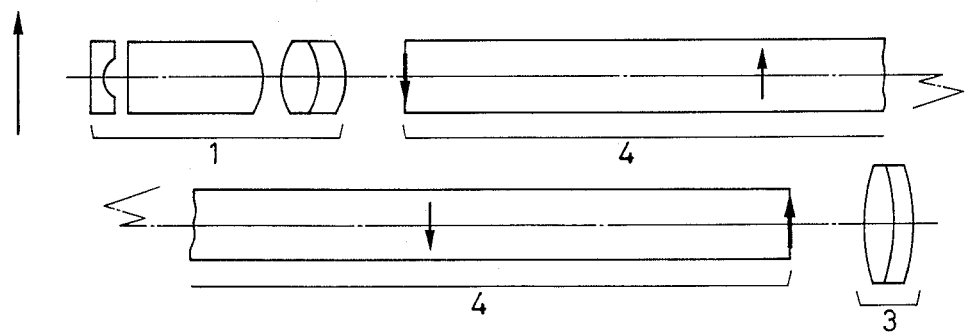
Figure 5:
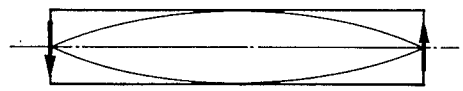
FIG. 5 shows a state of rays in an inhomogeneous lens.
Figure 18:
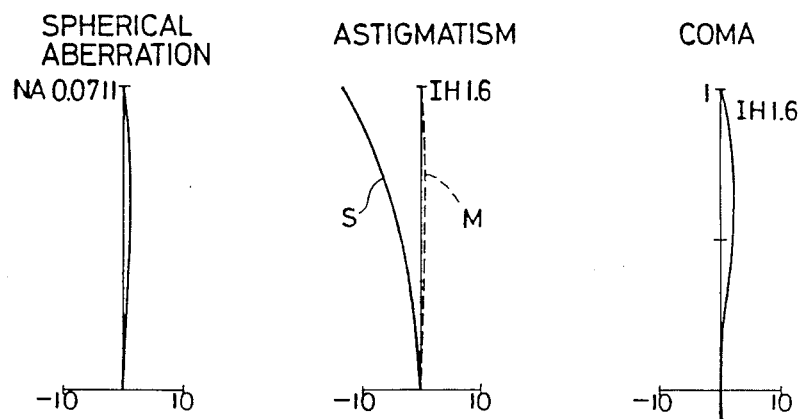

The aberration state of this Embodiment 1 according to the present invention is as shown in FIG. 18 where aberrations are several times smaller compared with those of the conventional system using only homogeneous lenses shown in FIG. 2 and are the same as those of the conventional system shown in FIG. 3.

Figure 8:
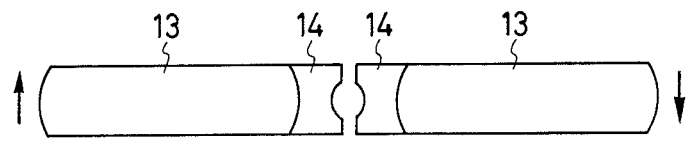
FIGS. 8 through 17 respectively show sectional views of Embodiments 2 through 11 of the image-transmitting optical system according to the present invention; and, FIGS. 18 through 28 respectively show graphs illustrating aberration curves of Embodiments 1 through 11 of the image-transmitting optical system according to the present invention.

In Embodiment 2 according to the present invention, as shown in FIG. 8, the cemented surface is curved, and a biconvex homogeneous lens 13 and a biconcave inhomogeneous lens 14 are cemented together.

The numerical data of this Embodiment 2 according to the present invention are as follows:

$r_1$ = 20.0154
$d_1$ = 36.0007     $n_1$ = 1.62004
$r_2$ = −136.1808
$d_2$ = 9.9993      $n_2$ = 1.6455      (inhomogeneous)
$r_3$ = 7.2239
$d_3$ = 2.000
$r_4$ = −7.2239
$d_4$ = 9.9993      $n_3$ = 1.6455      (inhomogeneous)
$r_5$ = 136.1808

-continued

```
d₅ = 36.0007        n₄ = 1.62004
r₆ = −20.0154
N(0) = 1.6455                N(1) = −0.58903 × 10⁻²
N(2) = 0.25461 × 10⁻⁴        N(3) = −0.15054 × 10⁻⁶
R_φ = 0.859 > 0.2            R_p = 1.248 > 0.2
```

Figure 19:
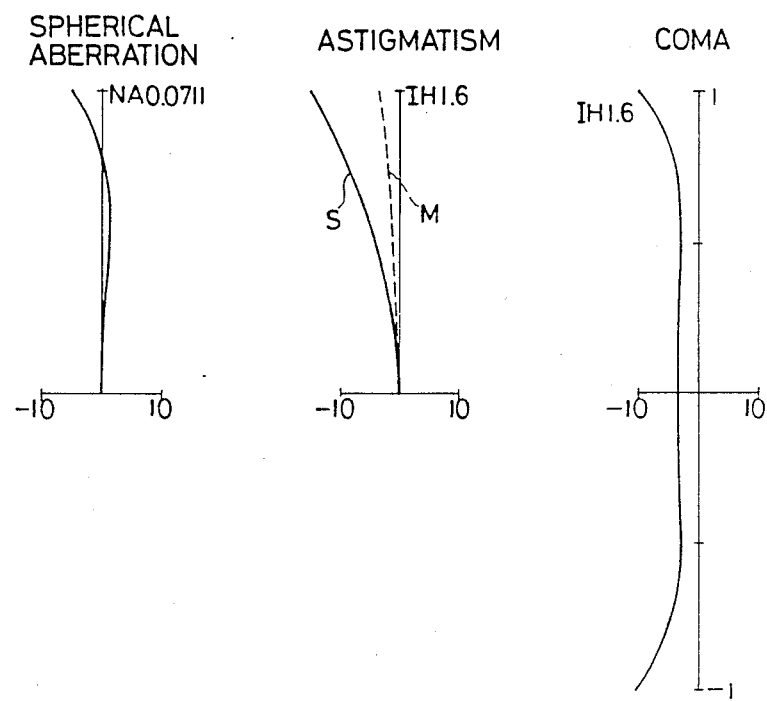

The aberration state of this Embodiment 2 according to the present invention is as shown in FIG. 19. As is evident from this Figure, the curvature of field is substantially eliminated.

The characteristic of this Embodiment 2 according to the present invention is that, as is explained above, the cemented surface between the homogeneous lens 13 and the inhomogeneous lens 14 to concave and the refractive index of the homogeneous lens 13 is lower than that of the inhomogeneous lens 14 so that the cemented surface assumes a concave function. Spherical aberration is eliminated by this surface, which is advantageous compared with the case where spherical aberration is eliminated only by the air-contact surface of an inhomogeneous lens.

Figure 9:
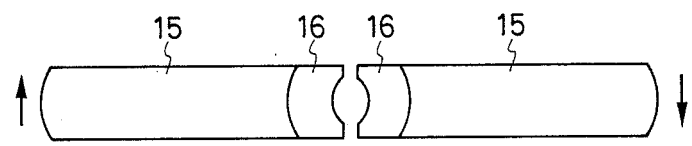

In Embodiment 3 according to the present invention, the construction of the lens system is as shown in FIG. 9 where, similarly to Embodiment 2, the cemented surface between the homogeneous lens and the inhomogeneous lens is curved, that is, the meniscus homogeneous lens 15 and the meniscus inhomogeneous lens 16 are cemented together. The numerical data thereof are as follows:

```
r₁ = 15.7656
d₁ = 37.5020        n₁ = 1.62004
r₂ = 35.500
d₂ = 8.4980         n₂ = 1.64550   (inhomogeneous)
r₃ = 19.0605
d₃ = 2
r₄ = −19.0605
d₄ = 8.4980         n₃ = 1.64550   (inhomogeneous)
r₅ = −35.500
d₅ = 37.5020        n₄ = 1.62004
r₆ = −15.7656
N(0) = 1.64550               N(1) = −0.44389 × 10⁻²
N(2) = 0.78169 × 10⁻⁵        N(3) = 0.5536 × 10⁻⁷
R_φ = 0.570 > 0.2            R_p = 0.893 > 0.2
```

Figure 20:
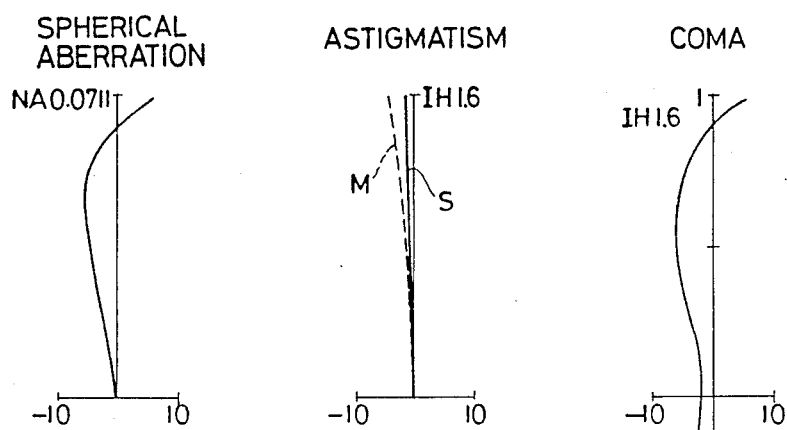

The aberration state of this Embodiment 3 according to the present invention is as shown in FIG. 20.

Figure 10:
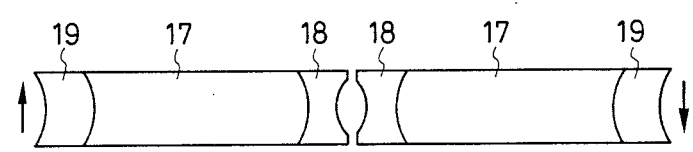

In Embodiment 4 according to the present invention, the lens construction is as shown in FIG. 10. In this Embodiment, the function as a field lens which is assumed by the convex surface of the inhomogeneous lens 11, for example, in Embodiment 1, is replaced by the inhomogeneous lens. That is, this Embodiment involves the construction in which the cemented lens comprising the homogeneous lens 17 and the inhomogeneous lens 18 which has the concave air-contact surface is, moreover, cemented to the inhomogeneous lens 19 having the function as a field lens. Because of the three lens composition, the construction becomes somewhat complicated but there are four air-contact surfaces for one time imge transmission.

The numerical data of this Embodiment 4 according to the present invention are as follows:

```
r₁ = −114.7395
d₁ = 7.2192         n₁ = 1.65      (inhomogeneous)
r₂ = −146.3917
d₂ = 31.6717        n₂ = 1.62004
```

```
r₃ = −67.5042
d₃ = 7.1092         n₃ = 1.6455    (inhomogeneous)
r₄ = 11.0475
d₄ = 2
r₅ = −11.0475
d₅ = 7.1092         n₄ = 1.6455    (inhomogeneous)
r₆ = 67.5042
d₆ = 31.6717        n₅ = 1.62004
r₇ = 146.3917
d₇ = 7.2192         n₆ = 1.65      (inhomogeneous)
r₈ = 114.7395
Coefficients of the lens 18
N(0) = 1.6455                N(1) = −0.63652 × 10⁻²
N(2) = 0.38077 × 10⁻⁴        N(3) = −0.89389 × 10⁻⁷
Coefficients of the lens 19
N(0) = 1.650                 N(1) = −0.29087 × 10⁻²
N(2) = 0.5148 × 10⁻⁵         N(3) = −0.10328 × 10⁻⁵
R_φ = 0.687 > 0.2            R_p = 1.06 > 0.2
```

In this Embodiment 4 according to the present invention, an inhomogeneous lens is used also for the field lens portion, the air-contact surface is made concave to generate a negative power so that the negative field curvature coefficient is obtained. Consequently, it is easier to correct curvature of field as compared with the lens system where the negative field curvature coefficient is generated only by the image-forming lens portion.

Figure 21:
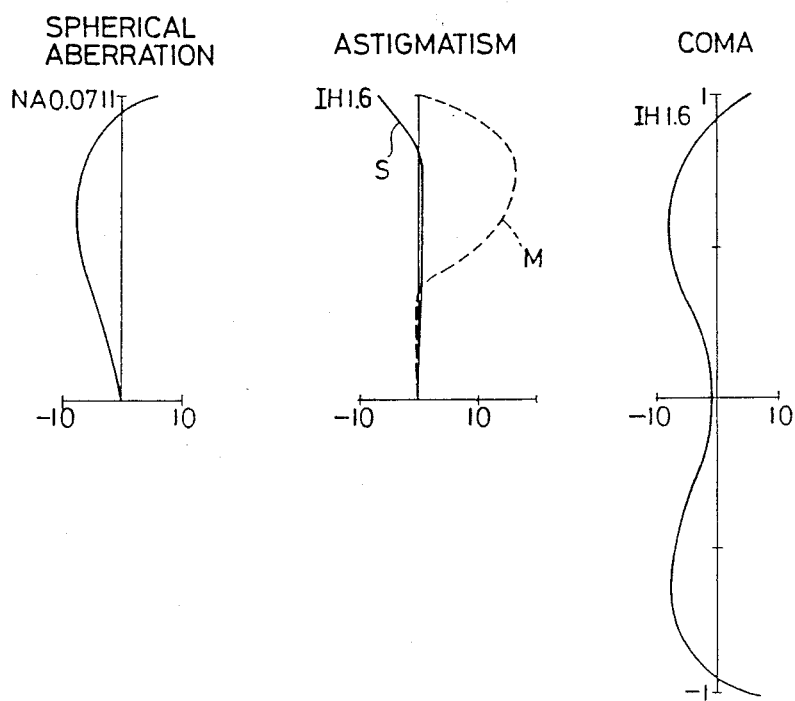

The aberration state of this Embodiment 4 according to the present invention is as shown in FIG. 21.

Figure 11:
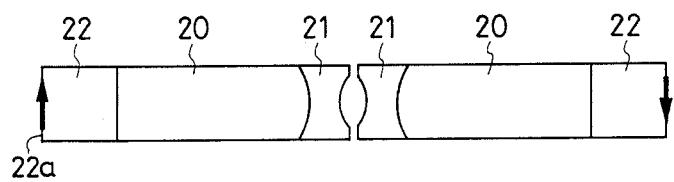

Embodiment 5 according to the present invention has the lens construction shown in FIG. 11 which is a simplification of the lens system of Embodiment 4 according to the present invention.

In this Embodiment 5 according to the present invention, an inhomogeneous lens 21 having the concave air-contact surface, a plano-convex homogeneous lens 20 and an inhomogeneous lens 22 having two plane surfaces are cemented together. The image is positioned on the outer surface 22a of the inhomogeneous lens 22 so that, for an arrangement where the image transmission takes place twice or more, it will be possible to cement the image-transmitting optical system to the next one at this surface. Therefore, for one time image transmission arrangement, there are four air-contact surfaces as is the case in other Embodiments. But in the case of an arrangement for twice or more image transmissions, it will be possible to decrease the number of air-contact surfaces by having the lens systems cemented in the above described manner. For example, for five time image transmissions, while there are 20 surfaces (4 surfaces × 5) in some other Embodiments, there are 12 surfaces (2 surfaces × 5 + 2 surfaces) in this Embodiment so that it is possible to decrease the number of air-contact surfaces considerably. Because of this, it will be possible obtain the optical system wherein there is smaller amount of illumination loss which is caused by the air-contact surfaces, and there is also smaller amount of flare.

The numerical data of this Embodiment 5 according to the present invention are as follows:

```
r₁ = ∞
d₁ = 8.0525         n₁ = 1.65      (inhomogeneous)
r₂ = ∞
d₂ = 32.5050        n₂ = 1.62004
r₃ = −71.3024
d₃ = 7.9425         n₃ = 1.64550   (inhomogeneous)
r₄ = 10.8763
d₄ = 3
```

-continued

| | | | |
|---|---|---|---|
| $r_5 = -10.8763$ | | | |
| $d_5 = 7.9425$ | $n_4 = 1.64550$ | (inhomogeneous) | |
| $r_6 = 71.3032$ | | | |
| $d_6 = 32.5050$ | $n_5 = 1.62004$ | | |
| $r_7 = \infty$ | | | |
| $d_7 = 8.0525$ | $n_6 = 1.65$ | (inhomogeneous) | |
| $r_8 = \infty$ | | | |
| Coefficients of the lens 21 | | | |
| $N(0) = 1.6455$ | | $N(1) = -0.59877 \times 10^{-2}$ | |
| $N(2) = 0.31945 \times 10^{-4}$ | | $N(3) = -0.16593 \times 10^{-6}$ | |
| Coefficients of the lens 22 | | | |
| $N(0) = 1.65$ | | $N(1) = -0.20672 \times 10^{-2}$ | |
| $N(2) = 0.18077 \times 10^{-5}$ | | $N(3) = -0.12479 \times 10^{-6}$ | |
| $R_\phi = 0.674 > 0.2$ | | $R_p = 1.026 > 0.2$ | |

Figure 22:
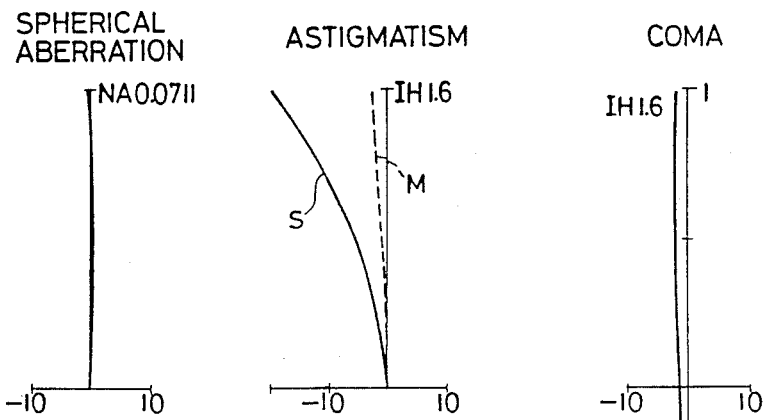

The aberration state of this Embodiment 5 according to the present invention is as shown in FIG. 22.

Figure 12:
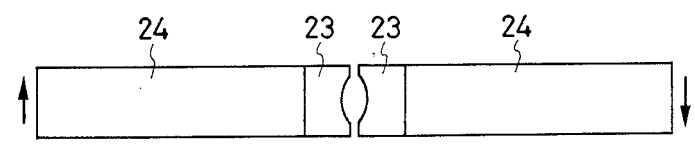

The optical system of Embodiment 6 according to the present invention comprises only inhomogeneous lenses. That is, as shown in FIG. 12, an inhomogeneous lens 24 having two plane surfaces and a plano-concave inhomogeneous lens 23 are cemented together, and the air-contact surface of the inhomogeneous lens 23 is concave. Thus, the optical system of Embodiment 6 according to the present invention has an extremely simple construction. In this Embodiment, the position of the image is formed out of the optical system, but it is also possible to set the position thereof on the lens surface. In the latter case, similarly to the case of Embodiment 5, when the plane of the inhomogneous lens 24 is cemented to the next image-transmitting optical system, it will be possible to decrease the number of air-contact surfaces.

The numerical data of this Embodiment 6 according to the present invention are as follows:

| | | | |
|---|---|---|---|
| $r_1 = \infty$ | | | |
| $d_1 = 36.0007$ | $n_1 = 1.6$ | (inhomogeneous) | |
| $r_2 = \infty$ | | | |
| $d_2 = 9.9993$ | $n_2 = 1.6455$ | (inhomogeneous) | |
| $r_3 = 14.1656$ | | | |
| $d_3 = 2$ | | | |
| $r_4 = -14.1656$ | | | |
| $d_4 = 9.9993$ | $n_3 = 1.6455$ | (inhomogeneous) | |
| $r_5 = \infty$ | | | |
| $d_5 = 36.0007$ | $n_4 = 1.6$ | (inhomogeneous) | |
| $r_6 = \infty$ | | | |
| Coefficients of the lens 23 | | | |
| $N(0) = 1.6455$ | | $N(1) = -0.27976 \times 10^{-2}$ | |
| $N(2) = 0.83925 \times 10^{-5}$ | | $N(3) = -0.21404 \times 10^{-7}$ | |
| Coefficients of the lens 24 | | | |
| $N(0) = 1.600$ | | $N(1) = -0.83305 \times 10^{-3}$ | |
| $N(2) = -0.29146 \times 10^{-6}$ | | $N(3) = -0.23355 \times 10^{-9}$ | |
| $R_\phi = 0.859 > 0.2$ | | $R_p = 1.340 > 0.2$ | |

Figure 23:
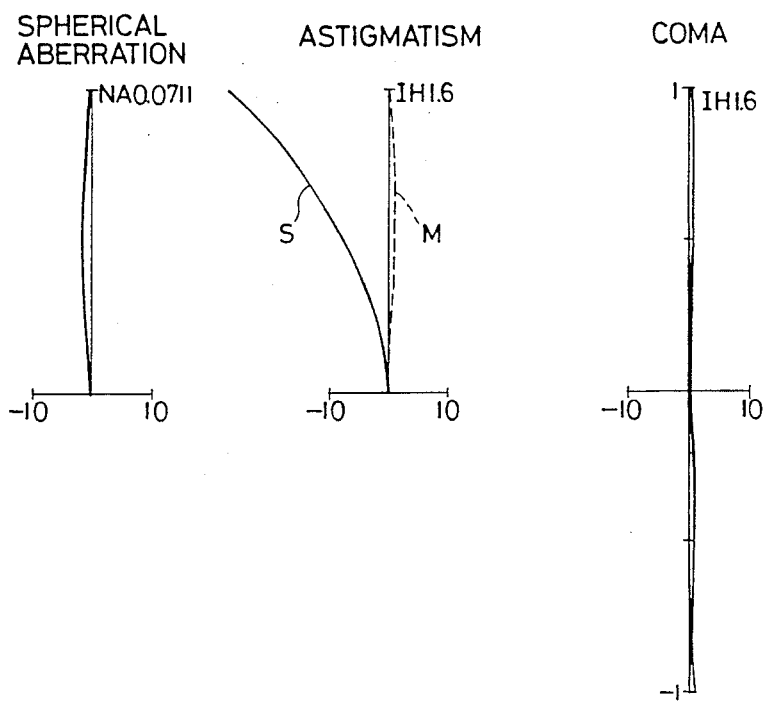

The aberration state of this Embodiment 6 according to the present invention is as shown in FIG. 23.

In the case of the construction as in this Embodiment, where two kinds of inhomogeneous lenses of which the gradients of the refractive index are different from each other are cemented together, there are following merits.

In the case of only one kind of an inhomogeneous lens the refractive index of which is homogeneous towards the axial direction and varies as the radius varies from the center to a periphery, even if the outside surface is made plane and the inside surface is made concave, it is impossible to transmit the pupil suitably as well as to eliminate curvature of field. But, it will be possible to do so when two kinds of inhomogeneous lenses are cemented together as in this Embodiment.

Figure 13:
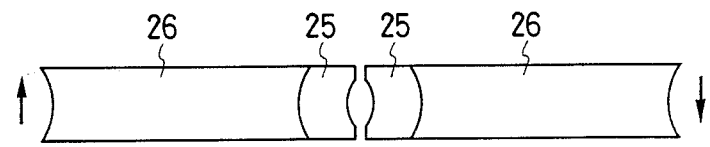

In Embodiment 7 according to the present invention, similarly to Embodiment 6, two kinds of inhomogeneous lenses are cemented, or a meniscus lens 25 having the concave air-contact surface and a biconcave inhomogeneous lens 26 are cemented to each other, as shown in FIG. 13.

The numerical data of this Embodiment 7 according to the present invention are as follows:

| | | | |
|---|---|---|---|
| $r_1 = -177.5001$ | | | |
| $d_1 = 35.9396$ | $n_1 = 1.6$ | (inhomogeneous) | |
| $r_2 = 8.7440$ | | | |
| $d_2 = 10.0604$ | $n_2 = 1.65$ | (inhomogeneous) | |
| $r_3 = 7.5261$ | | | |
| $d_3 = 2.00$ | | | |
| $r_4 = -7.5261$ | | | |
| $d_4 = 10.0604$ | $n_3 = 1.65$ | (inhomogeneous) | |
| $r_5 = -8.7440$ | | | |
| $d_5 = 35.9396$ | $n_4 = 1.6$ | (inhomogeneous) | |
| $r_6 = 177.5001$ | | | |
| Coefficients of the lens 25 | | | |
| $N(0) = 1.65$ | | $N(1) = -0.40793 \times 10^{-2}$ | |
| $N(2) = -0.30363 \times 10^{-5}$ | | $N(3) = -0.69905 \times 10^{-7}$ | |
| Coefficients of the lens 26 | | | |
| $N(0) = 1.6$ | | $N(1) = -0.83608 \times 10^{-3}$ | |
| $N(2) = -0.27653 \times 10^{-5}$ | | $N(3) = 0.94969 \times 10^{-8}$ | |
| $R_\phi = 1.146 > 0.2$ | | $R_p = 1.736 > 0.2$ | |

Figure 24:
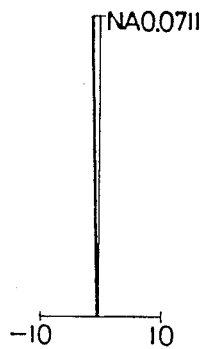
Figure 24:
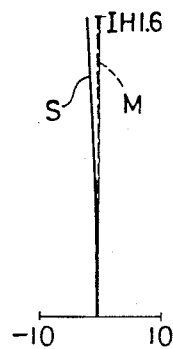
Figure 24:
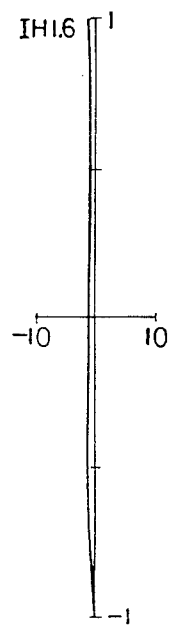

In this Embodiment 7 according to the present invention, it is possible to correct spherical aberration and coma by the cemented portion comprising the inhomogeneous lens 25 and the inhomogeneous lens 26. There is an advantage because the outside surface is concave. That is, it is possible to generate the negative field curvature coefficient by this surface in order to correct curvature of field. The aberration state of this Embodiment 7 according to the present invention is as shown in FIG. 24.

Figure 14:
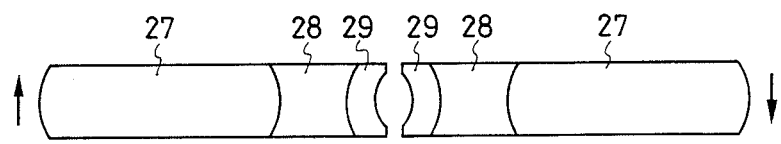

In Embodiment 8 according to the present invention, as shown in FIG. 14, an inhomogeneous lens 28 is cemented to a homogeneous lens 27, and another homogeneous lens 29 having a concave air-contact surface is also cemented thereto. Two lens components are arranged symmetrically such that the homogeneous lenses 29 are disposed in an inner portion of the lens system. In the inhomogeneous lens 28 of this optical system, the refractive index thereof is highest on the optical axis, and decrease towards a periphery substantially by self-multiplication distribution.

The numerical data of this Embodiment 8 according to the present invention are as follows:

| | | | |
|---|---|---|---|
| $r_1 = 20.0841$ | | | |
| $d_1 = 35.6556$ | $n_1 = 1.62004$ | | |
| $r_2 = -61.9563$ | | | |
| $d_2 = 9.6357$ | $n_2 = 1.79594$ (inhomogeneous) | | |
| $r_3 = 7.7267$ | | | |
| $d_3 = 0.7087$ | $n_3 = 1.51633$ | | |
| $r_4 = 9.1928$ | | | |
| $d_4 = 2$ | | | |
| $r_5 = -9.1928$ | | | |
| $d_5 = 0.7087$ | $n_4 = 1.51633$ | | |
| $r_6 = -7.7267$ | | | |
| $d_6 = 9.6357$ | $n_5 = 1.79594$ (inhomogeneous) | | |
| $r_7 = 61.9563$ | | | |
| $d_7 = 35.6556$ | $n_6 = 1.62004$ | | |
| $r_8 = -20.0841$ | | | |
| $N(0) = 1.79594$ | | $N(1) = -0.63916 \times 10^{-2}$ | |
| $N(2) = 0.33092 \times 10^{-4}$ | | $N(3) = -0.17218 \times 10^{-6}$ | |
| $R_\phi = 0.336 > 0.2$ | | $R_p = 0.969 > 0.2$ | |

In this Embodiment 8 according to the present invention, the inhomogeneous lens 28 has no air-contact surface, so that the air-contact surface of the homogeneous lens 29 is made concave. Similarly to Embodiments 1 through 7, the inhomogeneous lens 28 has the image-forming function and the air-contact surface plays the role of decreasing the Petzval sum, so that curvature of field is corrected suitably. In this case, the conditions for elimination of curvature of field are (1') and (2') mentioned below:

$$R_\phi = |\phi_s/\phi_g| > 0.2 \quad (1')$$

$$R_p = |P_s/P_g| > 0.2 \quad (2')$$

These conditions (1') and (2') are substantially equal to the conditions (1) and (2). In these conditions (1') and (2'), $\phi_g$ and $P_g$ represent respectively the power of the inner portion of the inhomogeneous lens (the power when both side surfaces thereof were parallel planes) and the field curvature coefficient generated by the inner portion of the inhomogeneous lens (the field curvature coefficient generated by the inhomogeneous lens when both side surfaces thereof were parallel planes), but $\phi_s$ and $P_s$ represent respectively the power of the concave air-contact surface of the homogeneous lens and the field curvature coefficient generated thereby.

If the above mentioned conditions are not satisfied, the function of eliminating curvature of field by the concave surface will become weak to degrade its effect, so that the system will become practically unusable.

Figure 25:
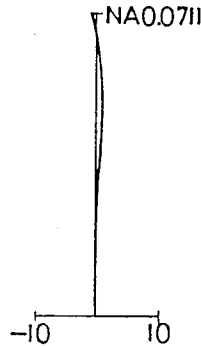
Figure 25:
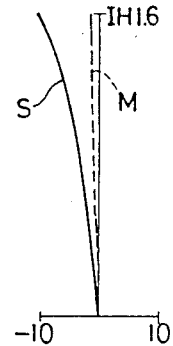
Figure 25:
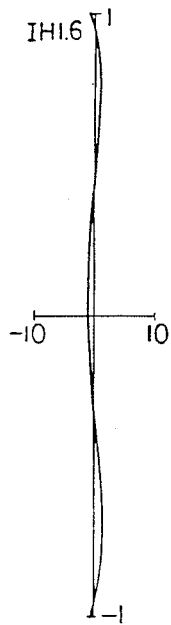

In this Embodiment 8 according to the present invention, $R_\phi = 0.336 > 0.2$ and $R_p = 0.969 > 0.2$, which satisfy the conditions (1') and (2'). Therefore, there is the function of eliminating curvature of field. In this Embodiment, there are many cemented surfaces so that it is easier to correct aberrations. The aberration state of this Embodiment 8 according to the present invention is as shown in FIG. 25.

Figure 15:
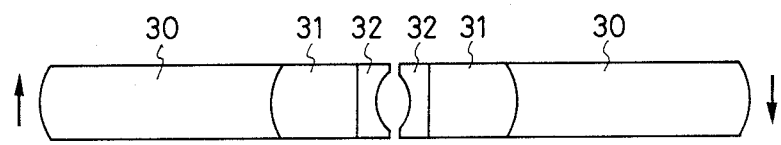

Embodiment 9 according to the present invention has the construction shown in FIG. 15, where a meniscus homogeneous lens 30 is cemented to one side of a plano-convex inhomogeneous lens 31, and a plano-concave homogeneous lens 32 is cemented to the other side of the inhomogeneous lens 31. And, two of these lenses are arranged symmetrically so that the concave surfaces of the homogeneous lens 32 are face to face with each other. The cemented surface between the inhomogeneous lens 31 and the homogeneous lens 30 is a curved surface having its center of curvature on the center side, and the cemented surface between the inhomogeneous lens 31 and the homogeneous lens 32 is plane.

The numerical data of this Embodiment 9 according to the present invention are as follows:

| | | |
|---|---|---|
| $r_1 = 20.5429$ | | |
| | $d_1 = 35.6627$ | $n_1 = 1.62004$ |
| $r_2 = 16.3387$ | | |
| | $d_2 = 9.6627$ | $n_2 = 1.64550$ (inhomogeneous) |
| $r_3 = \infty$ | | |
| | $d_3 = 0.6746$ | $n_3 = 1.51633$ |
| $r_4 = 6.5004$ | | |
| | $d_4 = 2$ | |
| $r_5 = -6.5004$ | | |
| | $d_5 = 0.6746$ | $n_4 = 1.51633$ |
| $r_6 = \infty$ | | |
| | $d_6 = 9.6627$ | $n_5 = 1.64550$ (inhomogeneous) |
| $r_7 = -16.3387$ | | |
| | $d_7 = 35.6627$ | $n_6 = 1.62004$ |
| $r_8 = -20.5429$ | | |

-continued

| | |
|---|---|
| $N(0) = 1.64550$ | $N(1) = -0.55234 \times 10^{-2}$ |
| $N(2) = -0.19013 \times 10^{-4}$ | $N(3) = -0.15994 \times 10^{-6}$ |
| $R_\phi = 0.546 > 0.2$ | $R_p = 1.328 > 0.2$ |

Figure 26:
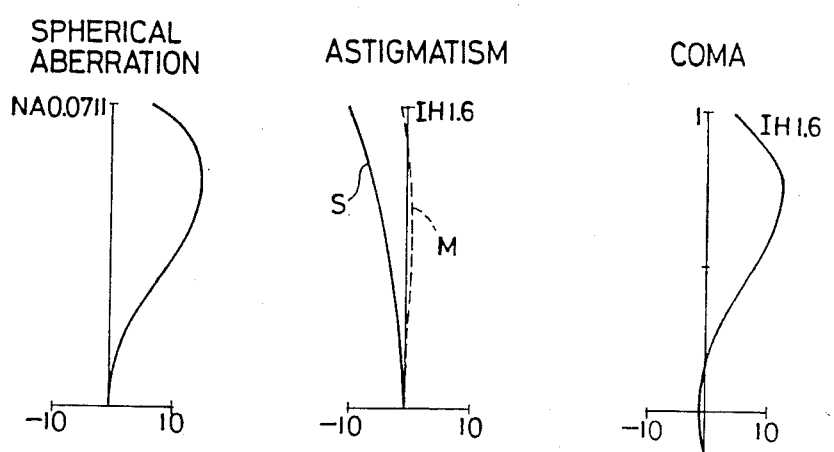

This Embodiment 9 according to the present invention satisfies the conditions (1') and (2'). The aberration state of this Embodiment is as shown in FIG. 26.

Figure 16:
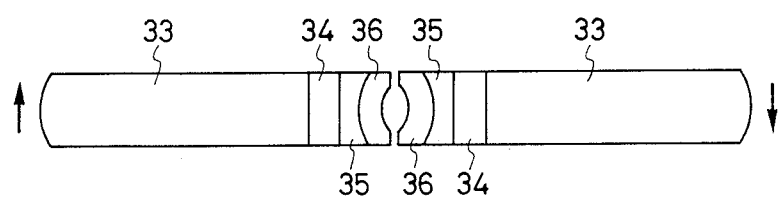

Embodiment 10 according to the present invention comprises one kind of inhomogeneous lens and three kinds of homogeneous lenses. As is shown in FIG. 16, a plano-convex homogeneous lens 33 is cemented to one side of an inhomogeneous lens 34 having two plane surfaces, and the cemented lens comprising a homogeneous lens 35 and another homogeneous lens 36 is cemented to the other side thereof. The homogeneous lens 36 has the concave air-contact surface. The optical system according to the present invention is arranged symmetrically with those concave surfaces being disposed face to face.

The numerical data of this Embodiment 10 according to the present invention are as follows:

| | | |
|---|---|---|
| $r_1 = 19.6041$ | | |
| | $d_1 = 37.0651$ | $n_1 = 1.62004$ |
| $r_2 = \infty$ | | |
| | $d_2 = 5.4819$ | $n_2 = 1.77883$ (inhomogeneous) |
| $r_3 = \infty$ | | |
| | $d_3 = 1.6739$ | $n_3 = 1.51633$ |
| $r_4 = 4.1982$ | | |
| | $d_4 = 2.0489$ | $n_4 = 1.62004$ |
| $r_5 = 8.7745$ | | |
| | $d_5 = 1.4586$ | |
| $r_6 = -8.7745$ | | |
| | $d_6 = 2.0489$ | $n_5 = 1.62004$ |
| $r_7 = -4.1982$ | | |
| | $d_7 = 1.6739$ | $n_6 = 1.51633$ |
| $r_8 = \infty$ | | |
| | $d_8 = 5.4819$ | $n_7 = 1.77883$ (inhomogeneous) |
| $r_9 = \infty$ | | |
| | $d_9 = 37.0651$ | $n_8 = 1.62004$ |
| $r_{10} = -19.6041$ | | |
| $N(0) = 1.77883$ | | $N(1) = -0.68544 \times 10^{-2}$ |
| $N(2) = 0.11515 \times 10^{-4}$ | | $N(3) = 0.16570 \times 10^{-7}$ |
| $R_\phi = 1.003 > 0.2$ | | $R_p = 1.836 > 0.2$ |

Figure 27:
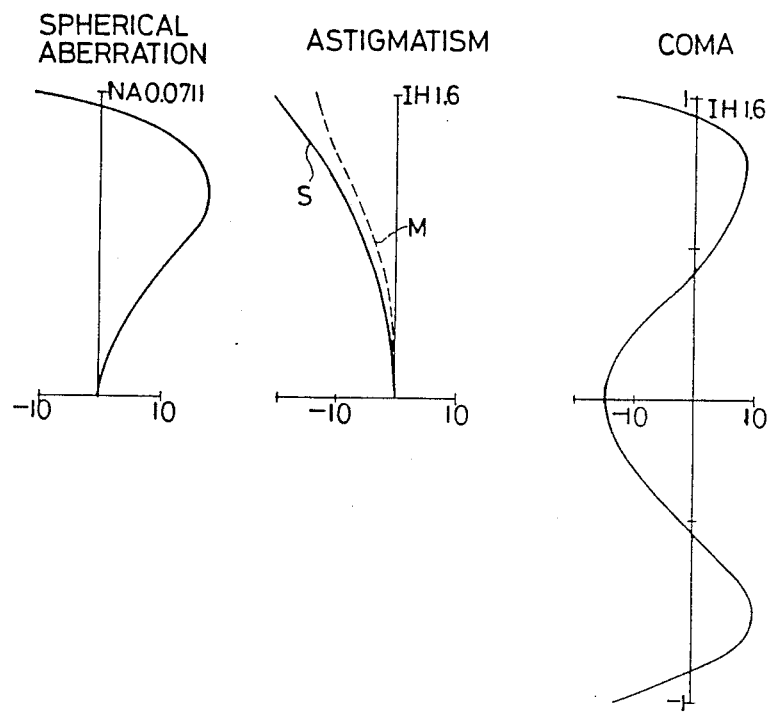

This Embodiment 10 according to the present invention satisfies the conditions (1') and (2'), and the aberration state thereof is as shown in FIG. 27.

Figure 17:
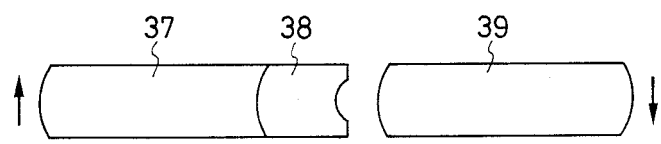

Embodiment 11 according to the present invention has the lens construction as shown in FIG. 17. All of the lens systems of the Embodiments 1 through 10 are arranged symmetrically. But, the arrangement of this Embodiment 11 is asymmetric. That is, this lens system comprises a cemented lens having a homogeneous lens 37 and an inhomogeneous lens 38, and a biconvex homogeneous lens 39. But the air-contact surface of the inhomogeneous lens 38 is concave and the other side surface thereof is cemented to the homogeneous lens 37, and this forms the basic construction according to the present invention.

The numerical data of this Embodiment 11 according to the present invention are as follows:

| | | |
|---|---|---|
| $r_1 = 404.5542$ | | |
| | $d_1 = 40.1460$ | $n_1 = 1.62004$ |
| $r_2 = 11.3674$ | | |
| | $d_2 = 10.8611$ | $n_2 = 1.64550$ (inhomogeneous) |
| $r_3 = 4.5659$ | | |
| | $d_3 = 3.3561$ | |
| $r_4 = 10.9087$ | | |

-continued

| | |
|---|---|
| $d_4 = 39.9009$ | $n_3 = 1.62004$ |
| $r_5 = -10.6031$ | |
| $N(0) = 1.6455$ | $N(1) = -0.603 \times 10^{-2}$ |
| $N(2) = -0.1107 \times 10^{-4}$ | $N(3) = -0.8838 \times 10^{-7}$ |
| $R_\phi = 1.240 > 0.2$ | $R_p = 1.763 > 0.2$ |

In this Embodiment 11 according to the present invention, only the component involving the inhomogeneous lens satisfies the conditions (1) and (2). The aberration state thereof is as shown in FIG. 28.

Even though the lens system is asymmetric as in this Embodiment 11 according to the present invention, it is possible to eliminate curvature of field.

In all of the Embodiments, the distance from image to image is 100 mm, N.A. is 0.0711, and the height of the image is 1.6.

In the data of each Embodiment, $r_1$, $r_2$, ... represent the radii of curvature of respective surfaces in the order from the incident side, $d_1$, $d_2$, ... represent the spaces between respective surfaces in the order from the incident side, and $n_1$, $n_2$, ... represent the refractive indices of the lenses (the refractive indices on the optical axis in the case of inhomogeneous lenses) in the order from the incident side.

The image-transmitting optical system according to the present invention has the various effects. For example, curvature of field is eliminated and the deterioration of the image is small even if the number of image transmissions increases. The construction thereof is so simple that it is possible to bring down the costs. Moreover, the number of lenses is small and the lenses are cemented together so that the deterioration of the image by the decentering developed when the lens system is assembled is small, and the number of air-contact surfaces is small so that the loss of illumination intensity and the amount of flare are small.

What is claimed is:

1. An image-transmitting optical system comprising two rod-like lens components having facing surfaces, said lens components being arranged so that one of said facing surfaces thereof is concave to the other facing surface, and at least one of said lens components constituting a plurality of lens elements including at least one inhomogeneous lens.

2. An image-transmitting optical system according to claim 1, satisfying the conditions (1) and (2) shown below:

$$R_\phi = |\phi_s/\phi_g| > 0.2 \quad (1)$$

$$R_p = |P_s/P_g| > 0.2 \quad (2)$$

where $\phi_g$ represents a power of an inner portion of said inhomogeneous lens, $\phi_s$ represents a power of said concave surface thereof, $P_g$ represents the field curvature coefficient generated by said inner portion of said inhomogeneous lens, and $P_s$ represents the field curvature coefficient generated by said concave surface thereof.

3. An image-transmitting optical system according to claim 2, said two lens components comprising in the order from the incident side, a lens component comprising a meniscus homogeneous lens and a meniscus inhomogeneous lens wherein one of the concave surfaces of said meniscus inhomogeneous lens and the convex surface of said meniscus inhomogeneous lens are cemented to each other, and a biconvex lens.

4. An image-transmitting optical system according to claim 3, the refractive index distribution of said inhomogeneous lens being expressed by the formula shown below, wherein said image-transmitting optical system has the following numerical data:

$$n(r) = N(0) + N(1) \cdot r^2 + N(2) \cdot r^4 + N(3) \cdot r^6 + \ldots$$

| | | |
|---|---|---|
| $r_1 = 404.5542$ | | |
| | $d_1 = 40.1460$ | $n_1 = 1.62004$ |
| $r_2 = 11.3674$ | | |
| | $d_2 = 10.8611$ | $n_2 = 1.64550$ (inhomogeneous) |
| $r_3 = 4.5659$ | | |
| | $d_3 = 3.3561$ | |
| $r_4 = 10.9087$ | | |
| | $d_4 = 39.9009$ | $n_3 = 1.62004$ |
| $r_5 = -10.6031$ | | |
| $N(0) = 1.6455$ | | $N(1) = -0.603 \times 10^{-2}$ |
| $N(2) = -0.1107 \times 10^{-4}$ | | $N(3) = -0.8838 \times 10^{-7}$ |
| $R_\phi = 1.240 > 0.2$ | | $R_p = 1.763 > 0.2$ | where $r_1$, $r_2$, ... respectively represent the radii of curvature of respective lens surfaces, $d_1$, $d_2$, ... respectively represent the thickness of respective lenses and the air-spaces between respective lenses, $n_1$, $n_2$, ... respectively represent the refractive indices of respective lenses, and $N(1)$, $N(2)$, ... respectively represent the coefficients of said refractive index distribution.

5. An image-transmitting optical system according to claim 1, said other surface being concave, and each of said lens components being a cemented lens constituting a plurality of lens elements including at least one inhomogeneous lens.

6. An image-transmitting optical system according to claim 5, said two lens components, respectively, comprising plano-concave homogeneous lenses and plano-concave inhomogeneous lenses, and being arranged symmetrically.

7. An image-transmitting optical system according to claim 6, the refractive index distribution of said inhomogeneous lens being expressed by the formula shown below, wherein said image-transmitting optical system has the following numerical data:

$$n(r) = N(0) + N(1) \cdot r^2 + N(2) \cdot r^4 + N(3) \cdot r^6 + \ldots$$

| | | |
|---|---|---|
| $r_1 = 17.8274$ | | |
| | $d_1 = 36.8593$ | $n_1 = 1.51633$ |
| $r_2 = \infty$ | | |
| | $d_2 = 8.4407$ | $n_2 = 1.6455$ (inhomogeneous) |
| $r_3 = 7.2122$ | | |
| | $d_3 = 3.4$ | |
| $r_4 = -7.2122$ | | |
| | $d_4 = 8.4407$ | $n_3 = 1.6455$ (inhomogeneous) |
| $r_5 = \infty$ | | |
| | $d_5 = 36.8593$ | $n_4 = 1.51633$ |
| $r_6 = -17.8274$ | | |
| $N(0) = 1.6455$ | | $N(1) = -0.6883 \times 10^{-2}$ |
| $N(2) = 0.34386 \times 10^{-4}$ | | $N(3) = -0.19156 \times 10^{-6}$ |
| $R_\phi = 0.852 > 0.2$ | | $R_p = 1.267 > 0.2$ | where $r_1$, $r_2$, ... respectively represent the radii of curvature of respective lens surfaces, $d_1$, $d_2$, ... respectively represent the thickness of respective lenses and the airspaces between respective lenses, $n_1$, $n_2$, ... respectively represent the refractive indices of respective lenses, and $N(1)$, $N(2)$, ... respectively represent the coefficients of said refractive index distribution.

8. An image-transmitting optical system according to claim 5, said two lens components, respectively, comprising biconvex homogeneous lenses and biconcave inhomogeneous lenses, and being arranged symmetrically.

9. An image-transmitting optical system according to claim 8, the refractive index distribution of said inhomogeneous lens being expressed by the formula shown below, wherein said image-transmitting optical system has the following numerical data:

$$n(r) = N(0) + N(1) \cdot r^2 + N(2) \cdot r^4 + N(3) \cdot r^6 + \ldots$$

| | | |
|---|---|---|
| $r_1 = 20.0154$ | | |
| | $d_1 = 36.0007$ | $n_1 = 1.62004$ |
| $r_2 = -136.1808$ | | |
| | $d_2 = 9.9993$ | $n_2 = 1.6455$ (inhomogeneous) |
| $r_3 = 7.2239$ | | |
| | $d_3 = 2.000$ | |
| $r_4 = -7.2239$ | | |
| | $d_4 = 9.9993$ | $n_3 = 1.6455$ (inhomogeneous) |
| $r_5 = 136.1808$ | | |
| | $d_5 = 36.0007$ | $n_4 = 1.62004$ |
| $r_6 = -20.0154$ | | |
| $N(0) = 1.6455$ | | $N(1) = -0.58903 \times 10^{-2}$ |
| $N(2) = 0.25461 \times 10^{-4}$ | | $N(3) = -0.15054 \times 10^{-6}$ |
| $R_\phi = 0.859 > 0.2$ | | $R_p = 1.248 > 0.2$ | where $r_1$, $r_2$, ... respectively represent the radii of curvature of respective lens surfaces, $d_1$, $d_2$, ... respectively represent the thickness of respective lenses and the air-spaces between respective lenses, $n_1$, $n_2$, ... respectively represent the refractive indices of respective lenses, and $N(1)$, $N(2)$, ... respectively represent the coefficients of said refractive index distribution.

10. An image-transmitting optical system according to claim 5, wherein each of said lens components comprises a meniscus homogeneous lens and a meniscus inhomogeneous lens, the concave surface of said meniscus homogeneous lens and the convex surface of said meniscus inhomogeneous lens are cemented to each other, and said lens components are arranged symmetrically.

11. An image-transmitting optical system according to claim 10, the refractive index distribution of said inhomogeneous lens being expressed by the formula shown below, wherein said image-transmitting optical system has the following numerical data:

$$n(r) = N(0) + N(1) \cdot r^2 + N(2) \cdot r^4 + N(3) \cdot r^6 + \ldots$$

| | | |
|---|---|---|
| $r_1 = 15.7656$ | | |
| | $d_1 = 37.5020$ | $n_1 = 1.62004$ |
| $r_2 = 35.500$ | | |
| | $d_2 = 8.4980$ | $n_2 = 1.64550$ (inhomogeneous) |
| $r_3 = 19.0605$ | | |
| | $d_3 = 2$ | |
| $r_4 = -19.0605$ | | |
| | $d_4 = 8.4980$ | $n_3 = 1.64550$ (inhomogeneous) |
| $r_5 = -35.500$ | | |
| | $d_5 = 37.5020$ | $n_4 = 1.62004$ |
| $r_6 = -15.7656$ | | |
| $N(0) = 1.64550$ | | $N(1) = -0.44389 \times 10^{-2}$ |
| $N(2) = 0.78169 \times 10^{-5}$ | | $N(3) = 0.5536 \times 10^{-7}$ |
| $R_\phi = 0.570 > 0.2$ | | $R_p = 0.893 > 0.2$ | where $r_1$, $r_2$, ... respectively represent the radii of curvature of respective lens surfaces, $d_1$, $d_2$, ... respectively represent the thickness of respective lenses and the air-spaces between respective lenses, $n_1$, $n_2$, ... respectively represent the refractive indices of respective lenses, and $N(1)$, $N(2)$, ... respectively represent the coefficients of said refractive index distribution.

12. An image-transmitting optical system according to claim 5, wherein each of said lens components comprises a meniscus inhomogeneous lens, a meniscus homogeneous lens and a biconcave inhomogeneous lens, the convex surface of said meniscus inhomogeneous lens and the concave surface of said meniscus homogeneous lens are cemented to each other, the convex surface of said meniscus homogeneous lens and one of the concave surfaces of said biconcave inhomogeneous lens are cemented to each other, and said lens components are arranged symmetrically.

13. An image-transmitting optical system according to claim 12, the refractive index distribution of said inhomogeneous lens being expressed by the formula shown below, wherein said image-transmitting optical system has the following numerical data:

$$n(r) = N(0) + N(1) \cdot r^2 + N(2) \cdot r^4 + N(3) \cdot r^6 + \ldots$$

| | | |
|---|---|---|
| $r_1 = -114.7395$ | | |
| | $d_1 = 7.2192$ | $n_1 = 1.65$ (inhomogeneous) |
| $r_2 = -146.3917$ | | |
| | $d_2 = 31.6717$ | $n_2 = 1.62004$ |
| $r_3 = -67.5042$ | | |
| | $d_3 = 7.1092$ | $n_3 = 1.6455$ (inhomogeneous) |
| $r_4 = 11.0475$ | | |
| | $d_4 = 2$ | |
| $r_5 = -11.0475$ | | |
| | $d_5 = 7.1092$ | $n_4 = 1.6455$ (inhomogeneous) |
| $r_6 = 67.5042$ | | |
| | $d_6 = 31.6717$ | $n_5 = 1.62004$ |
| $r_7 = 146.3917$ | | |
| | $d_7 = 7.2192$ | $n_6 = 1.65$ (inhomogeneous) |
| $r_8 = 114.7395$ | | |
| Coefficients of said biconcave inhomogeneous lenses | | |
| $N(0) = 1.6455$ | | $N(1) = -0.63652 \times 10^{-2}$ |
| $N(2) = 0.38077 \times 10^{-4}$ | | $N(3) = -0.89389 \times 10^{-7}$ |
| Coefficients of said meniscus inhomogeneous lenses | | |
| $N(0) = 1.650$ | | $N(1) = -0.29087 \times 10^{-2}$ |
| $N(2) = 0.5148 \times 10^{-5}$ | | $N(3) = -0.10328 \times 10^{-5}$ |
| $R_\phi = 0.687 > 0.2$ | | $R_p = 1.06 > 0.2$ | where $r_1$, $r_2$, ... respectively represent the radii of curvature of respective lens surfaces, $d_1$, $d_2$, ... respectively represent the thickness of respective lenses and the air-spaces between respective lenses, $n_1$, $n_2$, ... respectively represent the refractive indices of respective lenses, and $N(1)$, $N(2)$, ... respectively represent the coefficients of said refractive index distribution.

14. An image-transmitting optical system according to claim 5, wherein each of said lens components comprises an inhomogeneous lens having two parallel plane surfaces, a plano-convex homogeneous lens and a biconcave inhomogeneous lens, one of the surface of said inhomogeneous lens having two parallel plane surfaces and the plane surface of said plano-convex homogeneous lens being cemented to one of said plane surfaces, the convex surface of said plano-convex homogeneous lens and one of the concave surfaces of said biconcave inhomogeneous lens being cemented to each other, and said lens components are arranged symmetrically.

15. An image-transmitting optical system according to claim 14, the refractive index distribution of said inhomogeneous lens being expressed by the formula shown below, wherein said image-transmitting optical system has the following numerical data:

$$n(r) = N(0) + N(1) \cdot r^2 + N(2) \cdot r^4 + N(3) \cdot r^6 + \ldots$$

| | | |
|---|---|---|
| $r_1 = \infty$ | | |
| | $d_1 = 8.0525$ | $n_1 = 1.65$ (inhomogeneous) |
| $r_2 = \infty$ | | |

-continued

| | |
|---|---|
| $d_2 = 32.5050$ | $n_2 = 1.62004$ |
| $r_3 = -71.3024$ | |
| $d_3 = 7.9425$ | $n_3 = 1.64550$ (inhomogeneous) |
| $r_4 = 10.8763$ | |
| $d_4 = 3$ | |
| $r_5 = -10.8763$ | |
| $d_5 = 7.9425$ | $n_4 = 1.64550$ (inhomogeneous) |
| $r_6 = 71.3032$ | |
| $d_6 = 32.5050$ | $n_5 = 1.62004$ |
| $r_7 = \infty$ | |
| $d_7 = 8.0525$ | $n_6 = 1.65$ (inhomogeneous) |
| $r_8 = \infty$ | |
| Coefficients of said biconcave inhomogeneous lenses | |
| $N(0) = 1.6455$ | $N(1) = -0.59877 \times 10^{-2}$ |
| $N(2) = 0.31945 \times 10^{-4}$ | $N(3) = -0.16593 \times 10^{-6}$ |
| Coefficients of said inhomogeneous lenses having two parallel plane surfaces | |
| $N(0) = 1.65$ | $N(1) = -0.20672 \times 10^{-2}$ |
| $N(2) = 0.18077 \times 10^{-5}$ | $N(3) = -0.12479 \times 10^{-6}$ |
| $R\phi = 0.674 > 0.2$ | $R_p = 1.026 > 0.2$ | where $r_1, r_2, \ldots$ respectively represent the radii of curvature of respective lens surfaces, $d_1, d_2, \ldots$ respectively represent the thickness of respective lenses and the air-spaces between respective lenses, $n_1, n_2, \ldots$ respectively represent the refractive indices of respective lenses, and $N(1), N(2), \ldots$ respectively represent the coefficients of said refractive index distribution.

16. An image-transmitting optical system according to claim 5, wherein each of said lens components comprises an inhomogeneous lens having two parallel plane surfaces and a plano-concave inhomogeneous lens, one of the plane surfaces of said inhomogeneous lens having two parallel plane surfaces and the plane surface of said plano-concave inhomogeneous lens being cemented to one of said plane surfaces, and said lens components are arranged symmetrically.

17. An image-transmitting optical system according to claim 16, the refractive index distribution of said inhomogeneous lens being expressed by the formula shown below, wherein said image-transmitting optical system has the following numerical data:

$$n(r) = N(0) + N(1) \cdot r^2 + N(2) \cdot r^4 + N(3) \cdot r^6 + \ldots$$

| | |
|---|---|
| $r_1 = \infty$ | |
| $d_1 = 36.0007$ | $n_1 = 1.6$ (inhomogeneous) |
| $r_2 = \infty$ | |
| $d_2 = 9.9993$ | $n_2 = 1.6455$ (inhomogeneous) |
| $r_3 = 14.1656$ | |
| $d_3 = 2$ | |
| $r_4 = -14.1656$ | |
| $d_4 = 9.9993$ | $n_3 = 1.6455$ (inhomogeneous) |
| $r_5 = \infty$ | |
| $d_5 = 36.0007$ | $n_4 = 1.6$ (inhomogeneous) |
| $r_6 = \infty$ | |
| Coefficients of said plano-concave inhomogeneous lenses | |
| $N(0) = 1.6455$ | $N(1) = -0.27976 \times 10^{-2}$ |
| $N(2) = 0.83925 \times 10^{-5}$ | $N(3) = -0.21404 \times 10^{-7}$ |
| Coefficients of said inhomogeneous lenses having two parallelplane surfaces | |
| $N(0) = 1.600$ | $N(1) = -0.83305 \times 10^{-3}$ |
| $N(2) = -0.29146 \times 10^{-6}$ | $N(3) = -0.23355 \times 10^{-9}$ |
| $R\phi = 0.859 > 0.2$ | $R_p = 1.340 > 0.2$ | where $r_1, r_2, \ldots$ respectively represent the radii of curvature of respective lens surfaces, $d_1, d_2, \ldots$ respectively represent the thickness of respective lenses and the air-spaces between respective lenses, $n_1, n_2, \ldots$ respectively represent the refractive indices of respective lenses, and $N(1), N(2), \ldots$ respectively represent the coefficients of said refractive index distribution.

18. An image-transmitting optical system according to claim 5, wherein each of said lens components comprises a biconcave inhomogeneous lens and meniscus inhomogeneous lens, one of the concave surface of said biconcave inhomogeneous lens and the convex surface of said meniscus inhomogeneous lens are cemented to each other, and said lens components are arranged symmetrically.

19. An image-transmitting optical system according to claim 18, the refractive index distribution of said inhomogeneous lens being expressed by the formula shown below, wherein said image-transmitting optical system has the following numerical data:

$$n(r) = N(0) + N(1) \cdot r^2 + N(2) \cdot r^4 + N(3) \cdot r^6 + \ldots$$

| | |
|---|---|
| $r_1 = -177.5001$ | |
| $d_1 = 35.9396$ | $n_1 = 1.6$ (inhomogeneous) |
| $r_2 = 8.7440$ | |
| $d_2 = 10.0604$ | $n_2 = 1.65$ (inhomogeneous) |
| $r_3 = 7.5261$ | |
| $d_3 = 2.00$ | |
| $r_4 = -7.5261$ | |
| $d_4 = 10.0604$ | $n_3 = 1.65$ (inhomogeneous) |
| $r_5 = -8.7440$ | |
| $d_5 = 35.9396$ | $n_4 = 1.6$ (inhomogeneous) |
| $r_6 = 177.5001$ | |
| Coefficients of said meniscus inhomogeneous lenses | |
| $N(0) = 1.65$ | $N(1) = -0.40793 \times 10^{-2}$ |
| $N(2) = -0.30363 \times 10^{-5}$ | $N(3) = -0.69905 \times 10^{-7}$ |
| Coefficients of said biconcave inhomogeneous lenses | |
| $N(0) = 1.6$ | $N(1) = -0.83608 \times 10^{-3}$ |
| $N(2) = -0.27653 \times 10^{-5}$ | $N(3) = 0.94969 \times 10^{-8}$ |
| $R\phi = 1.146 > 0.2$ | $R_p = 1.736 > 0.2$ | where $r_1, r_2, \ldots$ respectively represent the radii of curvature of respective lens surfaces, $d_1, d_2, \ldots$ respectively represent the thickness of respective lenses and the air-spaces between respective lenses, $n_1, n_2, \ldots$ respectively represent the refractive indices of respective lenses, and $N(1), N(2), \ldots$ respectively represent the coefficients of said refractive index distribution.

20. An image-transmitting optical system according to claim 5, wherein each of said lens components comprises a biconvex homogeneous lens, a biconcave inhomogeneous lens and a meniscus homogeneous lens, one of the convex-surfaces of said biconvex homogeneous lens and one of the concave surfaces of said biconcave inhomogeneous lens are cemented to each other, the other one of the concave surfaces of said biconcave inhomogeneous lens and the concave surface of said meniscus homogeneous lens are cemented to each other, and said lens components are arranged symmetrically.

21. An image-transmitting optical system according to claim 20, the refractive index distribution of said inhomogeneous lens being expressed by the formula shown below, wherein said image-transmitting optical system has the following numerical data:

$$n(r) = N(0) + N(1) \cdot r^2 + N(2) \cdot r^4 + N(3) \cdot r^6 + \ldots$$

| | |
|---|---|
| $r_1 = 20.0841$ | |
| $d_1 = 35.6556$ | $n_1 = 1.62004$ |
| $r_2 = -61.9563$ | |
| $d_2 = 9.6357$ | $n_2 = 1.79594$ (inhomogeneous) |
| $r_3 = 7.7267$ | |
| $d_3 = 0.7087$ | $n_3 = 1.51633$ |

-continued

| | | |
|---|---|---|
| $r_4 = 9.1928$ | | |
| $d_4 = 2$ | | |
| $r_5 = -9.1928$ | | |
| $d_5 = 0.7087$ | $n_4 = 1.51633$ | |
| $r_6 = -7.7267$ | | |
| $d_6 = 9.6357$ | $n_5 = 1.79594$ (inhomogeneous) | |
| $r_7 = 61.9563$ | | |
| $d_7 = 35.6556$ | $n_6 = 1.62004$ | |
| $r_8 = -20.0841$ | | |
| $N(0) = 1.79594$ | $N(1) = -0.63916 \times 10^{-2}$ | |
| $N(2) = 0.33092 \times 10^{-4}$ | $N(3) = -0.17218 \times 10^{-6}$ | |
| $R\phi = 0.336 > 0.2$ | $R_p = 0.969 > 0.2$ | | where $r_1$, $r_2$, ... respectively represent the radii of curvature of respective lens surfaces, $d_1$, $d_2$, ... respectively represent the thickness of respective lenses and the air-spaces between respective lenses, $n_1$, $n_2$, ... respectively represent the refractive indices of respective lenses, and $N(1)$, $N(2)$, ... respectively represent the coefficients of said refractive index distribution.

22. An image-transmitting optical system according to claim 5, wherein each of said lens components comprises a meniscus homogeneous lens, a plano-convex inhomogeneous lens and a plano-concave homogeneous lens, the concave surface of said meniscus homogeneous lens and the convex surface of said plano-convex inhomogeneous lens are cemented to each other, the plane surface of said plano-convex inhomogeneous lens and the plane surface of said plano-concave homogeneous lens are cemented to each other, and said lens components are arranged symmetrically.

23. An image-transmitting optical system according to claim 22, the refractive index distribution of said inhomogeneous lens being expressed by the formula shown below, wherein said image-transmitting optical system has the following numerical data:

$$n(r) = N(0) + N(1) \cdot r^2 + N(2) \cdot r^4 + N(3) \cdot r^6 + \ldots$$

| | | |
|---|---|---|
| $r_1 = 20.5429$ | | |
| $d_1 = 35.6627$ | $n_1 = 1.62004$ | |
| $r_2 = 16.3387$ | | |
| $d_2 = 9.6627$ | $n_2 = 1.64550$ (inhomogeneous) | |
| $r_3 = \infty$ | | |
| $d_3 = 0.6746$ | $n_3 = 1.51633$ | |
| $r_4 = 6.5004$ | | |
| $d_4 = 2$ | | |
| $r_5 = -6.5004$ | | |
| $d_5 = 0.6746$ | $n_4 = 1.51633$ | |
| $r_6 = \infty$ | | |
| $d_6 = 9.6627$ | $n_5 = 1.64550$ (inhomogeneous) | |
| $r_7 = -16.3387$ | | |
| $d_7 = 35.6627$ | $n_6 = 1.62004$ | |
| $r_8 = -20.5429$ | | |
| $N(0) = 1.64550$ | $N(1) = -0.55234 \times 10^{-2}$ | |
| $N(2) = -0.19013 \times 10^{-4}$ | $N(3) = -0.15994 \times 10^{-6}$ | |
| $R\phi = 0.546 > 0.2$ | $R_p = 1.328 > 0.2$ | | where $r_1$, $r_2$, ... respectively represent the radii of curvature of respective lens surfaces, $d_1$, $d_2$, ... respectively represent the thickness of respective lenses and the air-spaces between respective lenses, $n_1$, $n_2$, ... respectively represent the refractive indices of respective lenses, and $N(1)$, $N(2)$, ... respectively represent the coefficients of said refractive index distribution.

24. An image-transmitting optical system according to claim 5, wherein each of said lens components comprises a plano-convex homogeneous lens, an inhomogeneous lens having two parallel plane surfaces, a plano-concave homogeneous lens and a meniscus homogeneous lens, the plane surface of said plano-convex homogeneous lens and one of plane surfaces of said homogeneous lens are cemented to each other, the other plane surface of said inhomogeneous lens and the plane surface of said plano-concave homogeneous lens are cemented to each other, and the concave surface of the said plano-concave homogeneous lens and the convex surface of said meniscus homogeneous lens are cemented to each other, and said lens components are arranged symmetrically.

25. An image-transmitting optical system according to claim 24, the refractive index distribution of said inhomogeneous lens being expressed by the formula shown below, wherein said image-transmitting optical system has the following numerical data:

$$n(r) = N(0) + N(1) \cdot r^2 + N(2) \cdot r^4 + N(3) \cdot r^6 + \ldots$$

| | | |
|---|---|---|
| $r_1 = 19.6041$ | | |
| $d_1 = 37.0651$ | $n_1 = 1.62004$ | |
| $r_2 = \infty$ | | |
| $d_2 = 5.4819$ | $n_2 = 1.77883$ (inhomogeneous) | |
| $r_3 = \infty$ | | |
| $d_3 = 1.6739$ | $n_3 = 1.51633$ | |
| $r_4 = 4.1982$ | | |
| $d_4 = 2.0489$ | $n_4 = 1.62004$ | |
| $r_5 = 8.7745$ | | |
| $d_5 = 1.4586$ | | |
| $r_6 = -8.7745$ | | |
| $d_6 = 2.0489$ | $n_5 = 1.62004$ | |
| $r_7 = -4.1982$ | | |
| $d_7 = 1.6739$ | $n_6 = 1.51633$ | |
| $r_8 = \infty$ | | |
| $d_8 = 5.4819$ | $n_7 = 1.77883$ (inhomogeneous) | |
| $r_9 = \infty$ | | |
| $d_9 = 37.0651$ | $n_8 = 1.62004$ | |
| $r_{10} = -19.6041$ | | |
| $N(0) = 1.77883$ | $N(1) = -0.68544 \times 10^{-2}$ | |
| $N(2) = 0.11515 \times 10^{-4}$ | $N(3) = 0.16570 \times 10^{-7}$ | |
| $R\phi = 1.003 > 0.2$ | $R_p = 1.836 > 0.2$ | | where $r_1$, $r_2$, ... respectively represent the radii of curvature of respective lens surfaces, $d_1$, $d_2$, ... respectively represent the thickness of respective lenses and the air-spaces between respective lenses, $n_1$, $n_2$, ... respectively represent the refractive indices of respective lenses, and $N(1)$, $N(2)$, ... respectively represent the coefficients of said refractive index distribution.

* * * * *